D. FRISBIE.
Elevator.
No. 224,416. Patented Feb. 10, 1880.
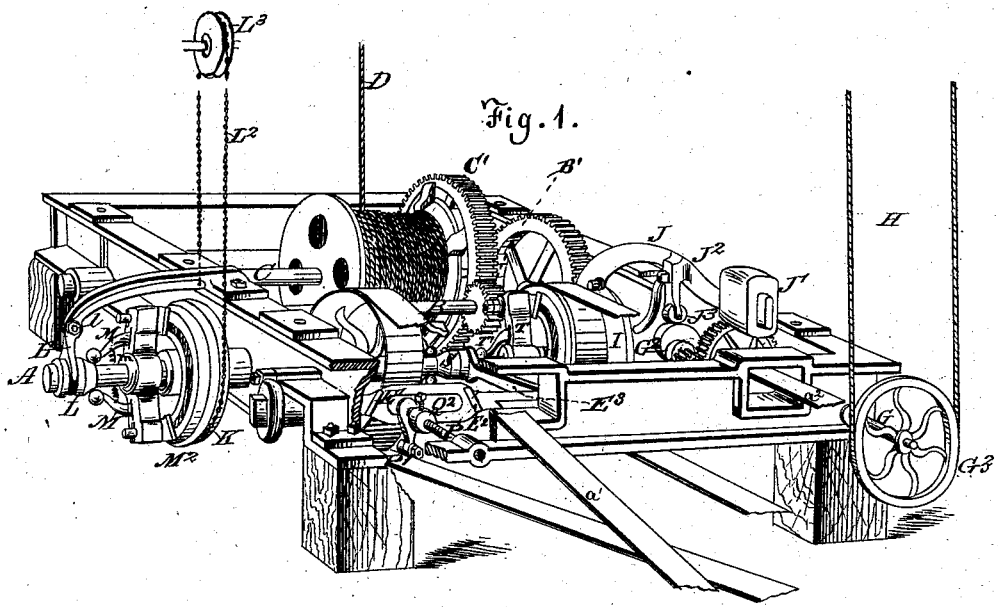
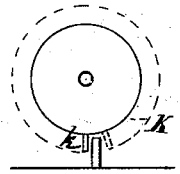
Fig. 4.
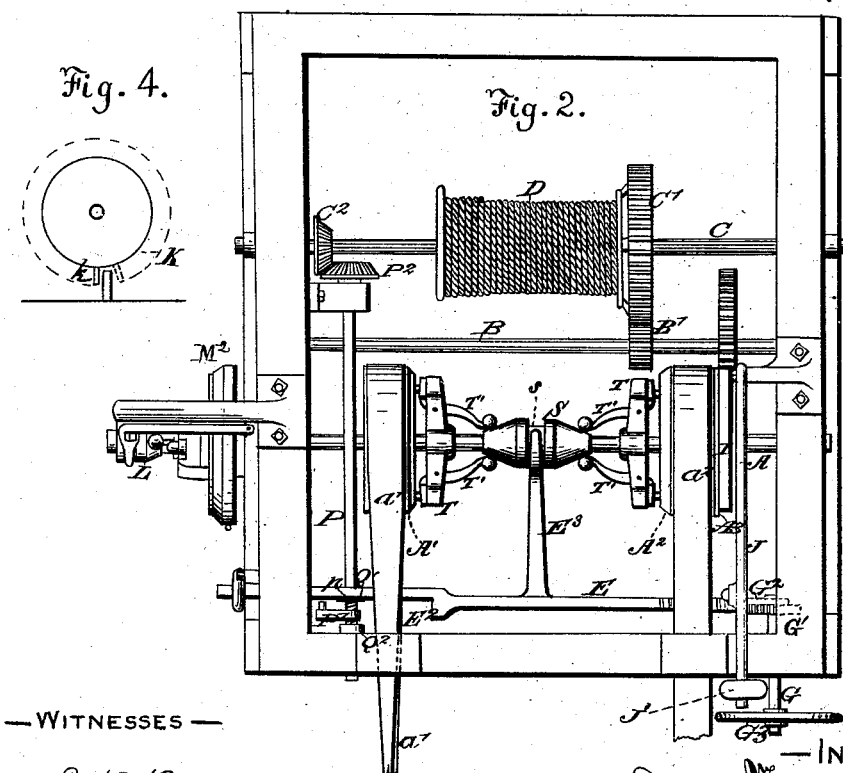
Fig. 2.
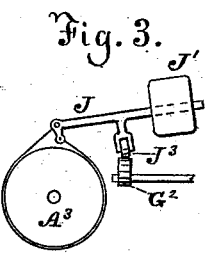
Fig. 3.
Fig. 5.
Witnesses —
E. B. Bolton
Charles C. Stetson
— Inventor —
Dennis Frisbie,
by his attorney
Thomas D. Stetson,

UNITED STATES PATENT OFFICE.

DENNIS FRISBIE, OF NEW HAVEN, CONNECTICUT, ASSIGNOR TO HIMSELF, STARR H. BARNUM, AND CHARLES F. ROOT, OF SAME PLACE.

ELEVATOR.

SPECIFICATION forming part of Letters Patent No. 224,416, dated February 10, 1880.

Application filed July 15, 1879.

*To all whom it may concern:*

Be it known that I, DENNIS FRISBIE, of New Haven, in the county of New Haven and State of Connecticut, have invented certain new and useful Improvements relating to Elevators, of which the following is a specification.

The convenience and practical importance of elevators in buildings make them universally desirable in all manufactories and in buildings devoted to offices; but although accidents from many sources have been guarded against with more or less effect, there are still chances of serious disaster. One is the danger that, through breakage or derangement of the connecting-gear, the rope may continue to be pulled to raise the elevator higher after it has reached its highest point, with the obvious liability of the rope to break and the elevator to fall the whole height. I have introduced an important provision intended to guard against this. I have also provided a brake or clutch mechanism, which is automatically thrown into action whenever the elevator runs in excess of the ordinary speed. I have also provided a brake which comes into effect at each change of the motion from raising to lowering, or the reverse.

The following is a description of what I consider the best means of carrying out the invention.

The accompanying drawings form a part of this specification.

Figure 1 is a general perspective view, and Fig. 2 is a plan, showing the same parts slightly modified. Fig. 3 is a side elevation, showing certain parts, on about the same scale, detached. Fig. 4 is a diagram, showing the action of certain parts, and Fig. 5 is a cross-section through certain parts on a larger scale.

Similar letters of reference indicate like parts in all the figures.

A is the first shaft, connected by gearing (not fully represented) with a second slower shaft, B. This latter gears by a small stout gear-wheel, B', with a large gear-wheel, C', on the main shaft or hoisting-shaft C. The latter carries a drum, on which is wound the rope D, which runs over a pulley (not shown) and operates the elevator, as will be understood. There are two pulleys, A' A², on the shaft A, driven, respectively, by open and cross belts $a'$ $a^2$, so that they run in opposite directions. Each can, at will, be connected by a friction-clutch with the shaft A, so as to impart its proper motion to it.

I prefer the form of friction-clutch set forth in the patent to Bean, March 3, 1874, No. 148,165; but this may be varied. It is sufficient to employ a strong and reliable friction-clutch, which is easily and certainly operated.

I operate the clutch by alternate endwise movements of a bar, E, one end of which is formed with a rack, and is engaged by the teeth of a spur-wheel, G', keyed on a transverse shaft, G. The outer end of this shaft carries a wheel, $G^3$, and to this applies an ordinary operating rope or chain, H, which extends up to the top of the building, and is conveniently placed to be operated by the attendant in the elevator at any time.

This apparatus, so far as yet described, operates in all respects in the ordinary manner, and gives all the advantages of the ordinary apparatus. On operating the rope H in one direction the bar E, arm $E^3$, double cone S, and clutch-arms T' T' are moved to engage the pulley A' and cause the elevator to rise. On operating the rope H in the opposite direction the bar E is shifted, the pulley A' is liberated, and the pulley $A^2$ engaged. Thus conditioned the elevator descends; but there is a liability to possible accident in the transition stage from one motion to the other. $A^3$ is a brake-pulley keyed on the shaft A, and encircled by a brake-strap, I, which is connected to a stout brake-lever, J, carrying a weight, J', sufficient to apply the brake with force whenever its weight is allowed to act. The same lever J carries a bracket, $J^2$, with an anti-friction roller, $J^3$. A cam, $G^2$, on the shaft beneath acts on this anti-friction roller. It requires a complete revolution of said shaft to change the motion of the elevator from raising to lowering, and the reverse. Near the termination of the turning motion of the shaft in either direction the cam $G^2$ lifts the lever J; but in the intermediate position, while the shaft is in the act of turning, the cam $G^2$ is turned downward and ceases to support the lever J. Thus conditioned the gravity of the lever J and its attachments applies the brake-strap I forcibly to the brake-pulley $A^3$ within it, and thus conditioned the elevator is firmly held against any motion upward or downward.

When all is properly working this brake is thus applied only for a moment. The continued motion of the cord H to reverse the motion turns the shaft G farther, and by means of the cam again elevates the lever J and sets the shaft A free to be operated by the desired belt running on its proper pulley; but in case of derangement this brake is ready to perform important service. It is applied at each change of motion, but is always entirely out of use whenever either friction-clutch is fairly engaged.

One end of the shaft A extends out beyond the main framing, and carries on its overhung end still another of the same kind of clutch or other efficient friction-clutch, $M^2$. This clutch, instead of connecting to a pulley which is entirely loose, connects to a pulley, K, which is free to make a partial revolution in either direction. A stop, $k$, is provided, which prevents it from ever making a complete revolution.

L is the cone, which may be moved endwise on the shaft A by the lever L', which turns on a fixed center, $l$. This is worked by a cord or chain, $L^2$, which runs over a pulley, $L^3$, and is secured on the periphery of the partially-revolving wheel K.

The levers M of the clutch $M^2$ are weighted, as indicated. In other respects the clutch is the ordinary Bean clutch. Whenever, through any possible derangement or fracture, the shaft A is turned too fast, allowing the elevator to descend with dangerous haste, the centrifugal force causes the weighted levers M M to spread and apply the clutch, so as to engage the shaft A with the partially-rotating wheel K, and so soon as the latter has made the portion of a revolution which is allowed to it its stop $k$ engages with the fixed framework and arrests the motion. This alone would serve to momentarily arrest the machinery; but so soon as the motion is thus arrested, if the levers M were allowed to draw together again the descent would be resumed, and thus the elevator would descend with a series of stops and starts, which would be annoying, if not dangerous. I provide springs $m$, which urge the levers M together with sufficient power to resist the centrifugal force at all ordinary velocities. My cord $L^2$, lever L', and cone L complete the arrangement.

Whenever, through an accident to the engine or other cause, the shaft A is set free and the elevator, commencing to descend, generates an unusually high velocity, throwing out the loaded levers M and engaging the wheel K, the partial turning of the wheel K acts, through the cord and lever, to drive the cone L into position between the levers M and hold them distended. The elevator is in such case firmly locked in place, and must remain there until the proper machinery is reconnected.

It remains to describe the provision for arresting the motion at the highest and lowest positions of the elevator independently of or additional to the ordinary provisions for operating the cord H. I propose to use all the ordinary precautions in addition.

A shaft, P, lies transverse to the main shaft on the left side of the apparatus. It is mounted in fixed bearings and extends loosely through a slot in the bar E. It carries an arm, P', which at each termination of its motion strikes an incline, E' or $E^2$, on the bar E, and moves it in the proper direction to arrest the motion. This constitutes a very reliable stop-motion to prevent overwinding. It is operated as follows: On the shaft C is a bevel-gear wheel, $C^2$, which engages in a bevel-gear wheel, $P^2$, on the transverse shaft P. A screw-thread, $p$, on this shaft engages loosely in the arm P'. The same screw-thread holds two nuts or collars, Q' $Q^2$, which are strongly set in the desired positions on the shaft P, according to the height of the building and the depth to which the elevator is to be allowed to descend, by taking care to properly engage the gearing.

One collar, Q', may be forged on the shaft, and the other, $Q^2$, only need be adjustable, to allow for different heights of buildings.

The parts are so proportioned and adjusted that the full motion of the elevator upward or downward first traverses the screw-thread idly through the arm P' until it is forced over hard against one of the collars, Q' or $Q^2$, and then commencing to turn said arm gives a little more than a half-turn thereto.

The bar E is by this device only half thrown. Consequently the action of arm P' does not reverse the motion of the mechanism, but only stops it. It throws the bar E, and consequently the connected shaft G, into that position which allows the brake J to come into effect and hold the parts motionless.

Various modifications in the details may be made. The arm P' may be fixed fast on the shaft P and worked by a worm on the shaft C; but this involves more expense in adapting the machinery to different heights of buildings.

I have represented the mechanism as mounted in a stout cast-iron frame, with the driving-belts $a'$ $a^2$ running through slots in such framing. I prefer this mode of construction, and can bolt such framing to any suitable parts, as the floor of a basement or cellar, or suitable blocks or brackets connected thereto.

I prefer gravity as a means for operating the brake J. It is more completely reliable than a spring or any other force. The continuous working of the brake J and its connections keeps those parts reliably in condition; so, also, of the arm P' and its connections. These are worked at every extreme position of the elevator. The safety-clutches L M and their connections are, on the contrary, rarely brought into use.

It is well to establish the practice of disconnecting the governor at short intervals—say at the commencement of each week's work—and running the elevator down intentionally too fast, so as to bring the safety-brake into action. This prevents rusting or other derangement from neglect, and is a means of testing the delicacy of the adjustment.

I claim as my invention—

1. In elevator mechanism, the brake I and the brake-lever J, in combination with the cam $G^2$, adapted to serve at each change of motion and hold the elevator motionless until the proper clutch is engaged, as herein specified.

2. In elevator mechanism, the safety-clutch $M^2$, having weighted parts M, in combination with the cord or chain $L^2$, connected to arrest the motion whenever it exceeds the proper amount, as herein specified.

3. In elevator mechanism, in combination with the safety-clutch $M^2$, having the weighted parts M, the partial-rotating wheel K, lever $L'$, cord $L^2$, and suitable connections to the locking device L, so that whenever the proper descending motion of the elevator is exceeded the clutch will not only be thrown into action and arrest the motion, but the locking device L will come into play and retain it in such condition, substantially as herein specified.

4. In elevator mechanism, the partial-revolving arm $P'$, connected to the main shaft C, as described, so as to perform only a partial revolution during the entire raising or lowering of the elevator, in combination with the surfaces $E'$ $E^2$ on the controlling-bar E, for the purpose of throwing the mechanism into the stopped position at each end of the motion, substantially as herein specified.

In testimony whereof I have hereunto set my hand this 3d day of July, 1879, in the presence of two subscribing witnesses.

DENNIS FRISBIE.

Witnesses:
WILLARD D. WARREN,
HENRY E. PARDEE.